(12) United States Patent
Tiwari et al.

(10) Patent No.: US 9,028,569 B2
(45) Date of Patent: May 12, 2015

(54) GASIFICATION QUENCH CHAMBER AND SCRUBBER ASSEMBLY

(75) Inventors: Prashant Tiwari, Clifton Park, NY (US); Aaron Avagliano, Houston, TX (US); Judeth Brannon Corry, Manvel, TX (US); Constantin Dinu, Katy, TX (US); Helge Burghard Herwig Klockow, Niskayuna, NY (US); Gregory Michael Laskowski, Saratoga Springs, NY (US); Sarah Marie Monahan, Latham, NY (US); Denise Marie Rico, Rio Grande, PR (US); James Michael Storey, Houston, TX (US)

(73) Assignee: General Electric Company, Niskayuna, NY (US)

( * ) Notice: Subject to any disclaimer, the term of this patent is extended or adjusted under 35 U.S.C. 154(b) by 1082 days.

(21) Appl. No.: 12/968,423

(22) Filed: Dec. 15, 2010

(65) Prior Publication Data

US 2011/0120010 A1    May 26, 2011

Related U.S. Application Data

(63) Continuation-in-part of application No. 12/495,439, filed on Jun. 30, 2009, and a continuation-in-part of application No. 12/494,385, filed on Jun. 30, 2009, now abandoned.

(51) Int. Cl.
*B01J 7/00* (2006.01)
*C10J 1/207* (2012.01)
*C10J 3/84* (2006.01)
(Continued)

(52) U.S. Cl.
CPC .. *C10J 3/84* (2013.01); *C10J 3/845* (2013.01);
Y02E 20/18 (2013.01); *C10J 3/485* (2013.01);
*C10J 3/74* (2013.01); *C10J 3/76* (2013.01);
(Continued)

(58) Field of Classification Search
USPC ......... 48/61, 127.1, 127.9, 76, 69, 67, 63–64, 48/87, 77
See application file for complete search history.

(56) References Cited

U.S. PATENT DOCUMENTS 2,818,326 A * 12/1957 Eastman et al. ................ 48/212
4,054,424 A * 10/1977 Staudinger et al. ............ 48/210
(Continued)

FOREIGN PATENT DOCUMENTS

JP    2003-522020 A *  8/2001
WO    2009023364 A2    2/2009

OTHER PUBLICATIONS

Search Report and Written Opinion from corresponding EP Application No. 11192781.0-1270 dated Apr. 12, 2012.
(Continued)

*Primary Examiner* — Kaity Handal
(74) *Attorney, Agent, or Firm* — Joseph J. Christian (57) ABSTRACT

A gasification quench chamber is disclosed. The gasification quench chamber includes a reservoir that contains liquid coolant in its lower portion and an exit for the cooled syngas in its upper portion; a dip tube that is configured to introduce a syngas mixture to contact the liquid coolant which produces the cooled syngas; a cooling device configured to further cool the cooled syngas in its upper portion; and a stability device in the lower portion that is configured to mitigate coolant level fluctuation and sloshing. In an embodiment of the quench chamber, the cooling device includes a heat exchanger pipe. A quench chamber and scrubber assembly is also disclosed.

12 Claims, 7 Drawing Sheets

(51) Int. Cl.
*C10J 3/48* (2006.01)
*C10J 3/74* (2006.01)
*C10J 3/76* (2006.01)

(52) U.S. Cl.
CPC .. *C10J2300/0959* (2013.01); *C10J 2300/0976* (2013.01); *C10J 2300/1671* (2013.01)

(56) References Cited

U.S. PATENT DOCUMENTS

| | | | |
|---|---|---|---|
| 4,377,394 A * | 3/1983 | Muenger et al. | 48/62 R |
| 4,778,483 A | 10/1988 | Martin et al. | |
| 5,415,673 A | 5/1995 | Hilton et al. | |
| 6,312,482 B1 * | 11/2001 | James et al. | 48/73 |
| 2008/0172941 A1* | 7/2008 | Jancker et al. | 48/73 |
| 2008/0222955 A1* | 9/2008 | Jancker et al. | 48/67 |
| 2009/0199474 A1 | 8/2009 | Leininger et al. | |
| 2009/0202403 A1 | 8/2009 | Jimenez-Huyke et al. | |
| 2010/0325957 A1 | 12/2010 | Klockow et al. | |

OTHER PUBLICATIONS

Search Report and Written Opinion from corresponding EP Application No. 11192781.0-1270 dated Jun. 13, 2012.

* cited by examiner

GASIFICATION QUENCH CHAMBER AND SCRUBBER ASSEMBLY

CROSS-REFERENCE TO RELATED PATENT APPLICATIONS

This application is a Continuation in Part, claiming priority to U.S. patent application Ser. No. 12/495,439, entitled "GASIFICATION SYSTEM FLOW DAMPING", filed on Jun. 30, 2009, which is hereby incorporated by reference.

This application is also a Continuation in Part, claiming priority to now abandoned U.S. patent application Ser. No. 12/494,385, entitled "QUENCH CHAMBER ASSEMBLY FOR A GASIFIER", filed on Jun. 30, 2009, which is hereby incorporated by reference.

BACKGROUND

The invention relates generally to gasifiers, and more particularly to a gasification quench chamber and scrubber assembly.

In a normal coal gasification process, wherein a particulated carbonaceous fuel such as coal or coke or a carbonaceous gas is burned, the process is carried out at relatively hot temperatures and high pressures in a combustion chamber. When injected fuel is burned or partially burned in the combustion chamber, an effluent is discharged through a port at a lower end of the combustion chamber to a gasification quench chamber, or quench chamber, disposed downstream of the combustion chamber. In other embodiments, there may be a radiant syngas cooler located between the combustion chamber and the quench unit. The quench chamber contains a liquid coolant such as water. The effluent from the combustion chamber is contacted with the liquid coolant in the quench chamber; so as to reduce the temperature of the effluent.

When the fuel is a solid such as coal or coke, the gasifier arrangement permits a solid portion of the effluent, in the form of slag, to be retained in the liquid pool of the quench chamber, and subsequently to be discharged as slag slurry. A gaseous component of the effluent is discharged from the quench chamber for further processing. The gaseous component, however, in passing through the quench chamber, will carry with it a substantial amount of the liquid coolant. A minimal amount of liquid entrained in the exiting gas is not considered objectionable to the overall process. However, excessive liquid carried from the quench chamber and into downstream equipment, is found to pose operational problems. The downstream equipment includes, for example, a scrubber assembly.

In conventional systems, a baffle is placed in the gas exiting path in the quench chamber. Consequently, as liquid-carrying gas contacts the baffle surfaces, a certain amount of the liquid will coalesce on the baffle surfaces. However, the rapidly flowing gas will re-entrain liquid droplets by sweeping droplets from the baffle's lower edge.

There is a need for an improved quench chamber assembly configured to cool an effluent gas from a combustion chamber and also remove entrained liquid content substantially from the effluent gas in a gasifier.

BRIEF DESCRIPTION

In accordance with one exemplary embodiment of the present invention, a gasification quench chamber comprises a reservoir having a liquid coolant disposed in a lower portion therein and an upper portion comprising an exit for exiting a cooled syngas therefrom; a dip tube configured to introduce a syngas mixture to contact the liquid coolant thereby producing the cooled syngas; a cooling device configured to further cool the cooled syngas in the upper portion; and a stability device in the lower portion, configured to mitigate coolant level fluctuation and sloshing.

In accordance with another exemplary embodiment of the present invention, a gasification assembly comprises a quench chamber comprising: a reservoir having a liquid coolant disposed in a lower portion therein and an upper portion comprising an exit for exiting a cooled syngas therefrom; a dip tube configured to introduce a syngas mixture to contact the liquid coolant thereby producing the cooled syngas; and a cooling device configured to further cool the cooled syngas in the upper portion; and a venturi scrubber, configured in downstream fluid communication of the quench chamber.

In accordance with another exemplary embodiment of the present invention, a gasification assembly comprises gasification quench chamber comprising: a reservoir comprising: a lower portion configured to contain a liquid coolant therein; and an upper portion configured to provide an exit to a cooled syngas; a dip tube configured to introduce a syngas mixture to contact the liquid coolant thereby producing the cooled syngas; and a heat exchange pipe in thermal communication with the cooled syngas in the upper portion, configured to produce at least one of steam or hot water therein by an interaction of the cooled syngas flowing over the heat exchange pipe.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for controlling flow dynamics within gasification system components, such as quench units and/or scrubbers. In general, quench units may receive hot effluent, such as syngas, from a gasification chamber. The hot effluent may be directed through a pool of cooling fluid within the quench unit to produce cooler, saturated (or partially saturated) syngas. Upon cooling, components, such as ash, may solidify within the pool of liquid for subsequent removal from the quench unit. From the quench unit, the cooler syngas may be directed to a scrubber. In generally, the syngas may flow through a pool of cooling fluid within the scrubber to remove any remaining particulates and/or entrained water from the syngas. During operation, the quench unit and/or the scrubber may experience flow fluctuations, such as fluctuations in cooling pool levels, gas flow rates, and/or pressure levels, which, in turn, may cause inefficient cooling or entrainment of cooling fluid within the syngas exiting the quench unit and/or the scrubber.

Accordingly, the present disclosure describes gasification system components, such as quench units and/or scrubbers, that include flow damping mechanisms designed to minimize flow fluctuations within the gasification system component. As used herein, the term "damping" may generally refer to reducing fluctuations or oscillations in flow and/or to reducing the intensity of flow oscillations. For example, the flow damping mechanisms may be designed to dissipate energy from flow fluctuations and/or to redirect uneven flow within the quench unit. In certain embodiments, the flow damping mechanisms may be disposed within the pool of liquid coolant to dampen fluctuations in the level of the pool, which in turn may reduce fluctuations in pressure and/or fluctuations in gas flow rate. For example, damping baffles may be disposed within the pool of liquid to restrict the flow area through the pool. In certain embodiments, the damping baffles may be designed to reduce the flow path area for the liquid by at least approximately fifty percent. The flow damping mechanisms also may be disposed within the gas flow path to control the pressure drop, which in turn may reduce fluctuations in the liquid pool levels and/or the gas flow rate.

Figure 1:
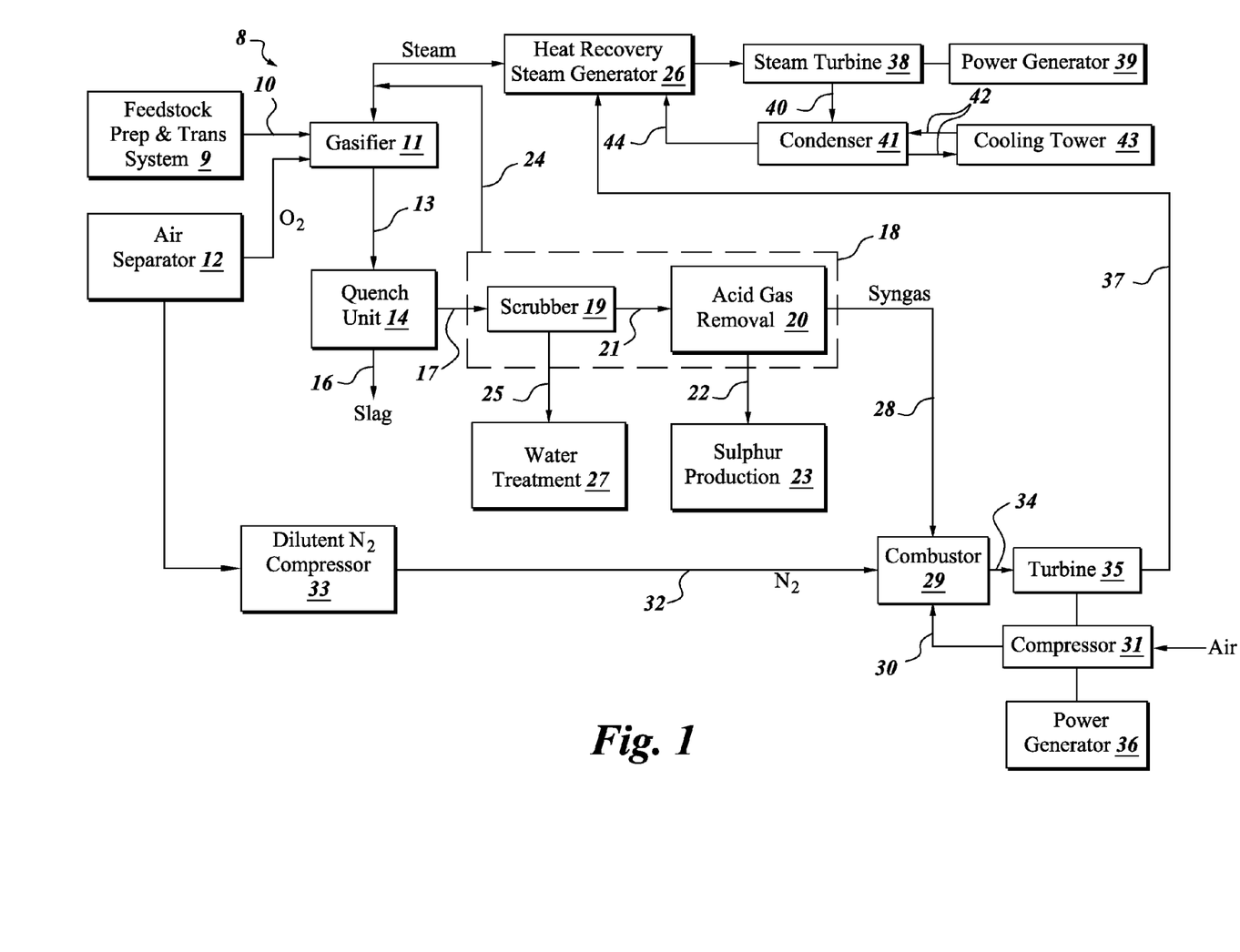
FIG. 1 is a block diagram of an integrated gasification combined cycle power generation system that may employ a gasification quench chamber and scrubber assembly, in accordance with an embodiment of the present invention.

FIG. 1 illustrates an embodiment of an integrated gasification combined cycle (IGCC) power generation system 8. Within the power generation system, gas, such as syngas, may be combusted to generate power within a "topping," or Brayton, cycle. Exhaust gas from the "topping" cycle may then be used to generate steam within a "bottoming," or Rankine, cycle.

To produce syngas, carbonaceous fuel, such as coke and lignite, may be introduced to the system 8 via a feedstock preparation and transportation system 9. The feed system 9 provides fuel slurry 10 to a gasifier 11, where the fuel is mixed with oxygen (O2) and steam (H2O). The oxygen may be provided from an air separator 12. The gasifier 11 heats the reactants to over approximately 700° C. in order to combust the volatile components in the fuel slurry to produce hot effluent, such as syngas 13. Due to chemical reactions between the oxygen, steam, and carbon (C), the syngas 13 may include hydrogen (H2), carbon monoxide (CO), and carbon dioxide (CO2) as well as other less desirable components, such as ash, sulfur, nitrogen, and chloride, present in the carbonaceous fuel.

From the gasifier 11, the syngas 13 may enter a quench unit 14. In certain embodiments, the quench unit 14 may be integral with the gasifier 11. However, in other embodiments, the quench unit 14 may be a separate unit. The quench unit 14 may cool the syngas 13 to at or near a saturation temperature through evaporation of a cooling fluid, such as water. During the cooling process, less desirable components, such as ash, may solidify and be removed from the quench unit 14 as slag 16. As the syngas 13 flows through the quench unit 14, the syngas 13 may be cooled to produce cooled syngas 17 that may exit the quench unit 14 and enter a gas cooling and treating system 18.

The gas cooling and treatment system 18 may include a scrubber 19 and an acid gas removal system 20, as well as other components. Within the gas cooling and treatment system 18, the syngas 17 from the quench unit 14 may enter the scrubber 19 where the syngas 17 may be further cooled to remove entrained water and/or remaining particulates. The scrubbed syngas 21 may exit the scrubber 19 and enter an acid gas removal system 20 where acid gases, such as carbon dioxide and hydrogen sulfide. Within the gas cooling and treatment system 18, sulfur components 22 may be removed and sent to a sulfur production system 23 for purification. Water also may be removed as a steam 24 and a liquid 25. The steam 24 may be recycled to the gasifier 11 and/or sent to a heat recovery steam generator (HRSG) system 26. The liquid water 25 may be sent to a water treatment system 27.

The gas cooling and treatment system 18 may produce sweetened syngas 28, which may be directed to a combustor 29 where the syngas 28 is combusted to generate power within the "topping" cycle. Air 30 may be provided to the combustor 29 from a compressor 31 to mix with the syngas 28 in a fuel-air ratio for combustion. Further, the combustor 29 may receive nitrogen 32 from the air separator 12 via a diluent nitrogen compressor 33 to cool the combustion reaction.

Exhaust 34 from the combustor 29 may flow through a turbine 35, which may drive the compressor 31 and/or an electrical generator 36 and produce exhaust 37. The exhaust 37 may then be directed to the HRSG system 26, which may recover heat from the exhaust 37 and from the steam 24 fed from the gas cooling and treating system 18. The recovered heat may be used to drive a steam turbine 38 to generate power within the "bottoming" cycle. For example, the steam turbine 38 may drive a generator 39 to generate electricity. Steam 40 from the steam turbine 38 may then be directed to a condenser 41, where the steam may be cooled by cooling fluid 42 from a cooling tower 43. The condensed steam 44 from the condenser 41 may then be recycled to the HRSG system 26.

As may be appreciated, the power generation system 8 is provided by way of example only and is not intended to be limiting. The flow damping mechanisms described herein may be employed within the quench unit 14 and/or the scrubber 19 to dampen flow fluctuations. However, in other embodiments, the flow damping mechanisms may be employed within any type of gasification quench unit and/or scrubber. For example, the flow damping mechanisms may be employed within a quench unit or scrubber designed to provide syngas to a gas turbine without an HRSG system. In another example, the flow damping mechanisms may be employed within a quench unit or scrubber that is part of a separate gasification system.

FIGS. 2-5 depict embodiments of a gasification system component 46. The gasification system component 46 may represent the quench unit 14 or the scrubber 19 shown in FIG. 1, as well as other types of gasification quench units and/or scrubbers. Moreover, although FIGS. 2-5 are generally described in the context of a quench unit, the flow damping mechanisms shown in these figures may be applied in a similar manner within a gasification scrubber.

Figure 2:
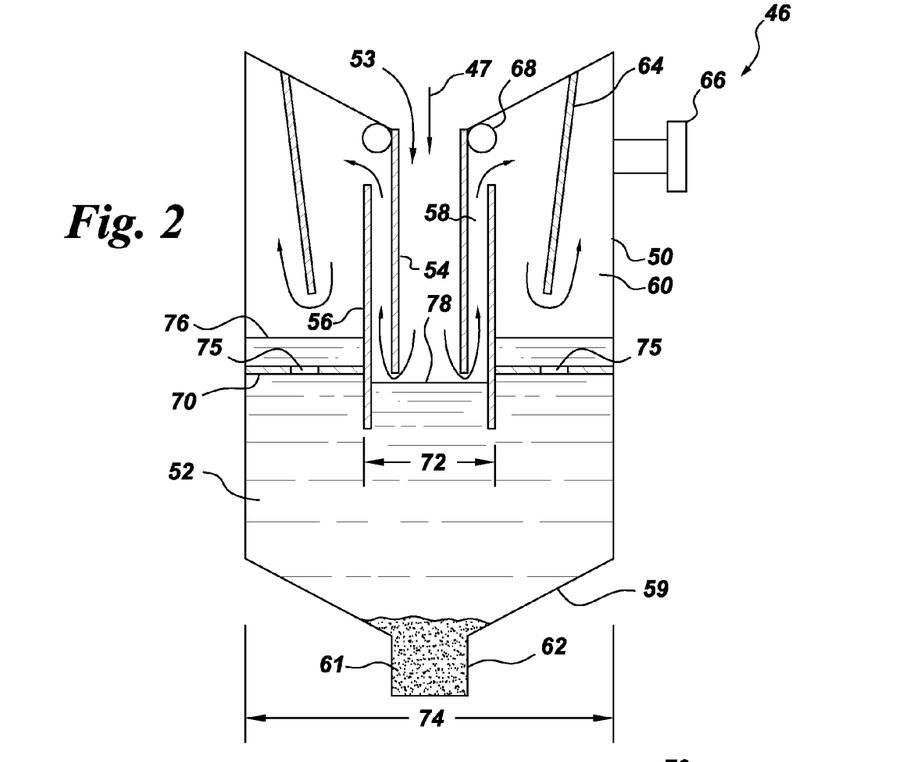
FIG. 2 is a front cross-sectional view of an embodiment of a gasification system component of FIG. 1 employing a damping plate.

FIG. 2 is a cross-sectional view of one embodiment of a gasification system component 46. As noted above, the gasification system component 46 may be a quench unit or a scrubber, such as the quench unit 14 or the scrubber 19. The gasification system component 46 includes a vessel 50 that retains a pool of cooling fluid 52, such as water. The gasification system component 46 may receive syngas 47 from an upstream component within the gasification system 8 (FIG. 1) through an opening 53. For example, if the gasification system component 46 represents the quench unit 14 (FIG. 1), the syngas 47, may represent the syngas 13 (FIG. 1) received from the gasifier 11 (FIG. 1). In another example, if the gasification system component 46 represents the scrubber 19 (FIG. 1), the syngas 47 may represent the syngas 17 (FIG. 1) exiting the quench unit 14 (FIG. 1). The syngas 47 may flow into the opening 53 within the gasification system component 46 through and inlet (not shown) within the top and/or sides of the vessel 50.

The cooling fluid 52 may be supplied to the vessel 50 from a water source (not shown) and replenished as needed to maintain a sufficient level for cooling within the vessel 50. As shown, the vessel 50 also includes two annular tubes 54 and 56. In certain embodiments, the tube 56 may be disposed concentrically around the tube 54. The dip tube 54 is disposed within the center of the vessel 50 to guide syngas 47 through the gasification system component 46. The draft tube 56 encircles the dip tube 54 to create an inner chamber 58. As shown generally by the arrows, the syngas 47 may flow through the dip tube 54 towards the pool of cooling fluid 52 contained within a lower and/or conical section 59 of the vessel 50. The syngas 47 may contact the cooling fluid 52, causing some of the cooling fluid to evaporate, thereby cooling the syngas 47.

From the dip tube 54, the syngas may flow up through the inner chamber 58 to an outer chamber 60. The outer chamber 60 may be generally formed in the annular space between the draft tube 56 and the walls of the vessel 50. However, in other embodiments, the draft tube 56 may be omitted. In these embodiments, the syngas may flow up through the outer chamber 60, which in these embodiments may extend in the annular space between the dip tube 54 and the walls of the vessel 50. In other words, in these embodiments, the inner chamber 58 and the outer chamber 60 may be combined into one continuous outer chamber 60 extending from the dip tube 54 to the walls of the vessel 50.

As the syngas 47 flows thorough the dip tube 54, the inner chamber 58, and the outer chamber 60, the syngas may be cooled by the cooling fluid 52 to reduce the temperature and pressure of the syngas. As the syngas is cooled, particulates 61, such as the slag 16, may collect within the bottom portion of the vessel 50 and may be discharged through a discharge port 62, which in certain embodiments, may lead to a lock hopper. Moreover, entrained liquid may be removed from the syngas 47 and may collect within the pool of the cooling fluid 52.

The upper portion of the chamber 60 may include an optional annular baffle 64 disposed around the draft tube 56. According to certain embodiments, the baffle 64 may be designed to direct the flow of syngas through the chamber 60, which in certain embodiments, may increase the flow path of the syngas, thereby facilitating cooling of the syngas. The baffle 64 also may provide a surface for coalescing liquid entrained in the syngas, thereby reducing entrainment of cooling liquid in the syngas exiting the chamber 60 through an outlet 66. An optional quench ring 68 may be disposed annularly about the dip tube 54 and may direct cooling fluid towards the inner surface of the dip tube 54 to protect the dip tube inner surface from the hot syngas 47. The quench ring 68 also may direct cooling fluid towards the baffle 64 and/or towards the pool of cooling fluid 52. However, in certain embodiments, for example, where the gasification system component 46 represents the scrubber 19, the baffle 64 and the quench ring 68 may be omitted.

To reduce flow fluctuations within the gasification system component 46, an annular damping plate 70 extends within the outer chamber 60 between the walls of the vessel 50 and the draft tube 56. As the syngas flows within the gasification system component 46, water from the quench ring 68 may flow through the gasification system component 46 and collect in the liquid pool 52. The damping plate 70 may be designed to dissipate energy from flow fluctuations within the pool of cooling liquid 52. The damping plate 70 may have an inner diameter 72 that generally corresponds to the outer diameter of the draft tube 56. The damping plate 70 may have an outer diameter 74 that generally corresponds to the inner diameter of the vessel 50. Accordingly, the damping plate 70 may be contiguously disposed with the walls of the vessel 50 and the draft tube 56 to restrict the flow of cooling liquid 52 through the outer chamber 60. The damping plate 70 may be affixed to the walls of the vessel 50 and/or the draft tube 56 by welding, bolting, or other suitable means.

Holes 75 within the damping plate 70 may allow the cooling fluid 52 to flow through the damping plate 70. However, the flow area provided by the holes 75 through the chamber 60 may be significantly less than the flow area within sections of the chamber 60 unrestricted by the damping plate 70. According to certain embodiments, the damping plate 70 may act as a flow restriction mechanism that reduces the flow area through the damping plate portion of the outer chamber 60 by at least approximately 50-100 percent, and all subranges therebetween. More specifically, the damping plate 70 may act as a flow restriction mechanism that reducing the flow area through the damping plate portion of the outer chamber by at least approximately 80-100 percent, and all subranges therebetween.

The damping plate 70 may generally be disposed within the outer chamber 60 such that the damping plate 70 is submerged within the pool of cooling fluid 52. For example, the damping plate 70 may be disposed below a level 76 of the cooling fluid pool 52 within the outer chamber 60. In certain embodiments, the damping plate 70 may be disposed above a level 78 of the cooling fluid pool 52 within the draft tube 56. However, in other embodiments, the damping plate 70 may be disposed below the level 78 of the cooling fluid pool 52 within the draft tube 56. Moreover, the damping plate 70 may generally be disposed at a sufficient height above the conical section 59 of the vessel 50 to impede accumulation of slag within the holes of the damping plate.

The levels 76 and 78 of the cooling fluid within the pool 52 may vary during operation of the gasification system component 46. In certain embodiments, the flow rate of the syngas 47 through the gasification system component 46 may vary, causing fluctuations in the levels 76 and 78. Moreover, in certain embodiments, the syngas 47 may flow into the pool 52, agitating the cooling fluid, thereby causing fluctuations in the levels 76 and 78. Further, the flow rate of the cooling fluid exiting the quench ring 68 may vary. The damping plate 70 may be designed to reduce fluctuations in the level 76 and/or in the level 78. Specifically, the damping plate 70 may provide a flow restriction that serves to dissipate energy from flow dynamics within the cooling fluid pool 52.

Figure 3:
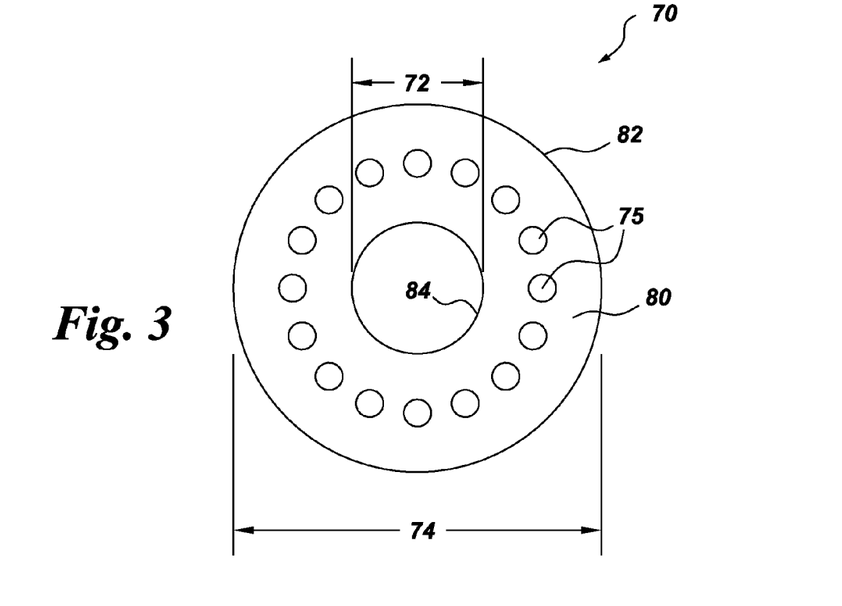
FIG. 3 is a top view of the damping plate of FIG. 2.

FIG. 3 is a top view of the damping plate 70. An outer circumference 82 of the damping plate 70 may be disposed contiguously against the walls of the vessel 50 and an inner circumference 84 may be disposed contiguously around the draft tube 56 (as shown in FIG. 2). The damping plate includes a surface area 80 generally defined by the difference between the outer diameter 74 and the inner diameter 72. The holes 75 may be spaced circumferentially around the surface area 80. As noted above, the surface area 80 and the area of the holes 75 may generally correspond to the total annular flow area available for water to pass through the outer chamber 60 vertically within the vessel 50. As described above with respect to FIG. 2, the damping plate 70 may be designed to restrict the flow area to the area provided by the holes 75 that are disposed within the surface area 80. According to certain embodiments, the area of the holes 75 may represent approximately 1-50% of the total annular flow area available, as defined by the surface area 80 and the holes 75. Within the damping plate 70, the number, spacing, sizes, and shapes of the holes 75 may vary. For example, the holes 75 may have a circular, oblong, elliptical, rectangular, square, or hexagonal cross-section, among others. Further, any number of holes of various shapes and sizes may be included within the damping plate. For example, the size and number of the holes 75 may be adjusted to provide a desired reduction in flow area while providing holes large enough to resist plugging.

Figure 4:
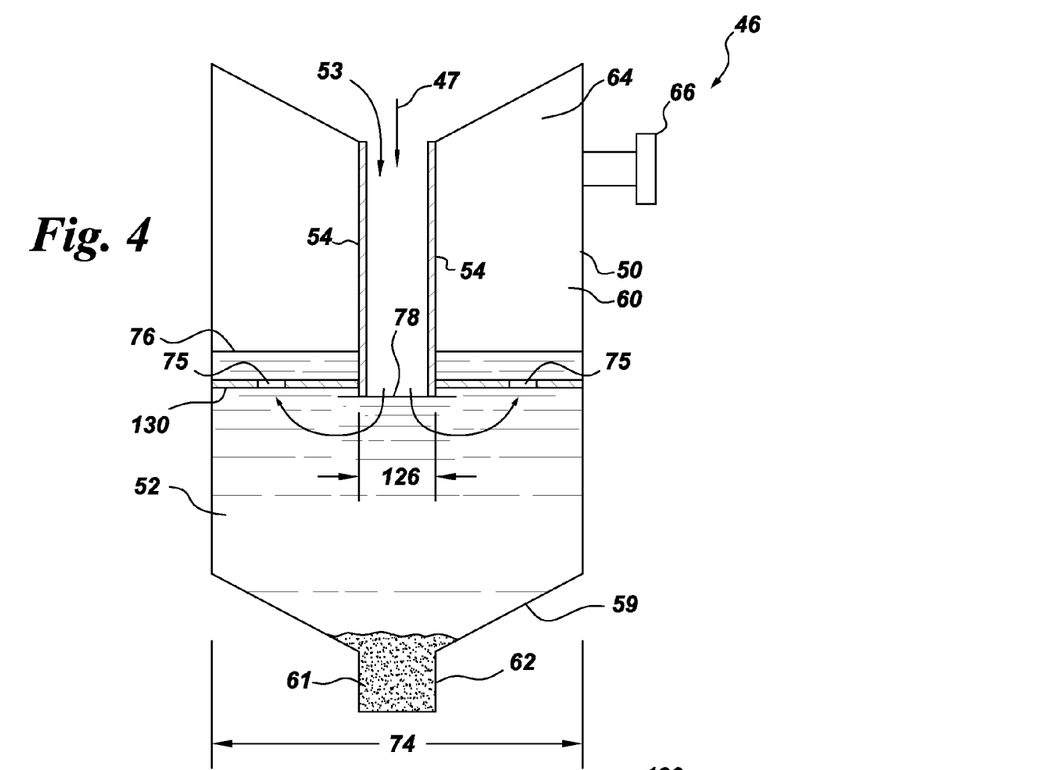
FIG. 4 is a front cross-sectional view of an embodiment of a gasification system component of FIG. 1 without a draft tube and employing a damping plate.
Figure 5:
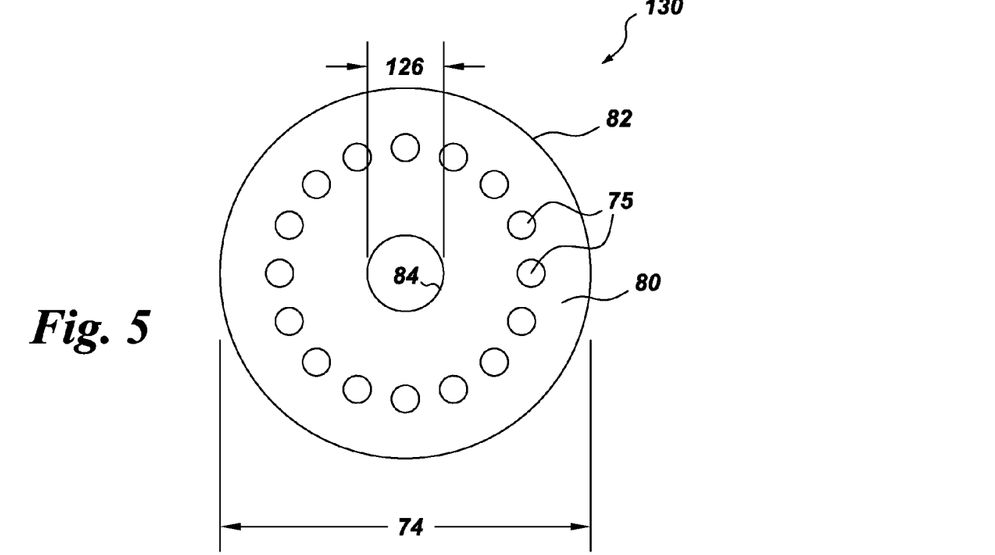
FIG. 5 is a top view of the damping plate of FIG. 4.

FIGS. 4-5 depict embodiments of the gasification system component 46 with the draft tube 56 omitted. In these embodiments, the baffle 64 and the quench ring 68 have also been omitted to generally depict a scrubber, such as the scrubber 19 shown in FIG. 1. However, in other embodiments, the flow damping mechanisms depicted in FIGS. 4-5 also may be employed within a quench unit, such as the quench unit 14 shown in FIG. 1.

As shown in FIG. 4, the syngas 47 may flow through the dip tube 54 within the vessel 50 as shown generally by the arrows. The syngas 47 may then exit the dip tube 54 and flow through the pool of cooling fluid 52 contained within a conical section 59 of the vessel 50. The syngas 47 may contact the cooling fluid 52, causing some of the cooling fluid to evaporate, thereby cooling the syngas 47 and removing entrained particulates and/or water from the syngas 47.

From the dip tube 54, the syngas may flow up through the outer chamber 60. The outer chamber 60 may be generally formed in the annular space between the dip tube 54 and the walls of the vessel 50. To reduce flow fluctuations within the gasification system component 46, an annular damping plate 130 extends within the outer chamber 60 between the walls of the vessel 50 and the dip tube 54. Similar to the damping plate 70 shown in FIG. 2, the damping plate 130 may be designed to dissipate energy from flow fluctuations within the pool of cooling liquid 52. The damping plate 130 may have an inner diameter 126 that generally corresponds to the outer diameter of the dip tube 54. The damping plate 130 may have an outer diameter 74 that generally corresponds to the inner diameter of the vessel 50. Accordingly, the damping plate 70 may be contiguously disposed with the walls of the vessel 50 and the dip tube 54 to restrict the flow of cooling liquid 52 through the outer chamber 60. The damping plate 130 may be affixed to the walls of the vessel 50 and/or the dip tube 54 by welding, bolting, or other suitable means.

Holes 75 within the damping plate 130 may allow the cooling fluid 52 to flow through the damping plate 130. However, the flow area provided by the holes 75 through the chamber 60 may be significantly less than the flow area within sections of the chamber 60 unrestricted by the damping plate 130. According to certain embodiments, the damping plate 130 may act as a flow restriction mechanism that reduces the flow area through the damping plate portion of the outer chamber 60 by at least approximately 50-100 percent, and all subranges therebetween. More specifically, the damping plate 130 may act as a flow restriction mechanism that reducing the flow area through the damping plate portion of the outer chamber by at least approximately 80-100 percent, and all subranges therebetween.

The damping plate 130 may generally be disposed within the outer chamber 60 such that the damping plate 130 is submerged within the pool of cooling fluid 52. For example, the damping plate 130 may be disposed below a level 76 of the cooling fluid pool 52 within the outer chamber 60. In certain embodiments, the damping plate 70 may be disposed above a level 78 of the cooling fluid pool 52 within the dip tube 54. However, in other embodiments, the damping plate 130 may be disposed below the level 78 of the cooling fluid pool 52 within the dip tube 54. Moreover, the damping plate 130 may generally be disposed at a sufficient height above the conical section 59 of the vessel 50 to impede accumulation of particulates within the holes of the damping plate.

FIG. 5 is a top view of the damping plate 130. The damping plate includes a surface area 80 generally defined by the difference between the outer diameter 74 and the inner diameter 126. The holes 75 may be spaced circumferentially around the surface area 80. As noted above, the surface area 80 and the area of the holes 75 may generally correspond to the total annular flow area available for water to pass through the outer chamber 60 vertically within the vessel 50. As described above with respect to FIG. 4, the damping plate 70 may be designed to restrict the flow area to the area provided by the holes 75 that are disposed within the surface area 80. According to certain embodiments, the area of the holes 75 may represent approximately 1-50% of the total annular flow area available, as defined by the surface area 80 and the holes 75. Within the damping plate 130, the number, spacing, sizes, and shapes of the holes 75 may vary. For example, the holes 75 may have a circular, oblong, elliptical, rectangular, square, or hexagonal cross-section, among others. Further, any number of holes of various shapes and sizes may be included within the damping plate. For example, the size and number of the holes 75 may be adjusted to provide a desired reduction in flow area while providing holes large enough to resist plugging.

The flow damping mechanisms depicted in FIGS. 2-5 may be employed separately or in combination with one another. Moreover, as may be appreciated, the relative sizes, shapes, and geometries of the flow damping mechanisms may vary. Further, certain components, such as the draft tube 56 and/or the quench ring 68 may be omitted. The flow damping mechanisms may be employed in the gasification system component 46 during the initial manufacturing, or the flow damping mechanisms may be retrofit into existing gasification system components 46. Further, the flow damping mechanisms may be adjusted based on operational parameters, such as the type of carbonaceous fuel, the system efficiency, the system load, or environmental conditions, among others to achieve the desired amount of flow damping.

Figure 6:
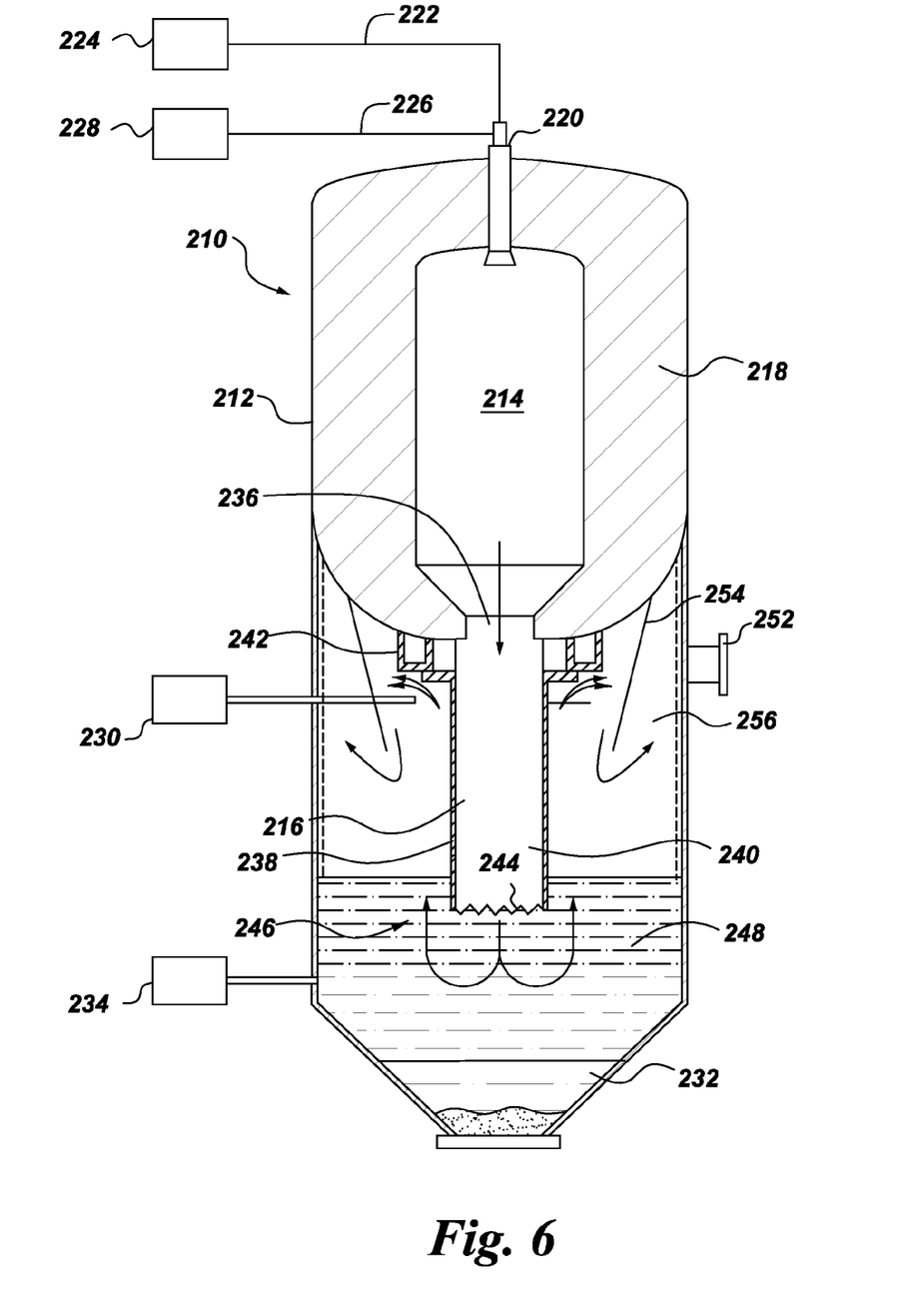
FIG. 6 is front cross-sectional view of a gasification quench chamber with only a dip tube in accordance with an embodiment of the present invention.

Referring to FIG. 6, an exemplary gasifier 210 is disclosed. The gasifier 210 includes an outer shell 212 housing a combustion chamber 214 at an upper end and a quench chamber 216 at a lower end. Combustion chamber 214 is provided with a refractory wall 218 capable of withstanding the normal operating temperatures. A burner 220 is coupled via a path 222 to a fuel source 224. A fuel stream including pulverized carbonaceous fuel such as coal, coke or the like, is fed into the combustion chamber 212 via the burner 220 removably disposed on an upper wall of the combustion chamber 214. The burner 220 is further coupled via a path 226 to a combustion supporting gas source 228 configured to supply gas such as oxygen or air.

The combustible fuel is burned in the combustion chamber 214 to produce an effluent including syngas and a particulated solid residue. Hot effluent is fed from the combustion chamber 214 to the quench chamber 216 provided at the lower end of the shell 212. The quench chamber 216 is coupled to a pressurized source 230 and configured to supply a pool of liquid coolant 232, preferably water to the quench chamber 216. The level of the liquid coolant in the quench chamber pool 216 is maintained at a desired height to assure an efficient operation depending on the conditions of the effluent fed from the combustion chamber 214 into the quench chamber 216. The lower end of the gasifier shell 212 is provided with a discharge port 234 through which water and fine particulates are removed from quench chamber 216 in the form of a slurry.

In the illustrated embodiment, a constricted portion 236 of the combustion chamber 214 is coupled to the quench chamber 216 via a dip tube 238. The hot effluent is fed from the combustion chamber 214 to the liquid coolant 232 in the quench chamber 216 via a passageway 240 of the dip tube 238. A quench ring 242 is disposed proximate to the dip tube 238 and coupled to the pressurized source 230 so as to sustain a dip tube inner wall in a wetted condition to best accommodate the downward effluent flow. A lower end 244 of the dip tube 238 may be serrated, and positioned below the surface of the liquid coolant 232 to efficiently achieve cooling of the effluent.

The syngas is contacted with the liquid coolant 232 to produce a cooled syngas. As discussed above, the gaseous component of the effluent is discharged for further processing via the exit path 252 from the quench chamber 216. It is known conventionally that the gaseous component, however, in passing through a quench chamber, will carry with it a substantial amount of the liquid coolant. Excessive liquid carried from the quench chamber and into downstream equipment, is found to pose operational problems. In the illustrated exemplary embodiment, an asymmetric or symmetric shaped baffle 254 is disposed proximate to the exit path 252 in the quench chamber 216. The baffle 254 extends a distance above the surface of liquid coolant 232. In the normal course of quench cooling, the cooled gas stream would convey with it a certain amount of liquid coolant. However, as the cooled gas stream impinges against the inner surface of baffle 254, the entrained liquid content in the gas stream will tend to coalesce on the inner surface of the baffle 254. The gas stream after impacting the baffle 254 reverses direction and then moves along a path 256 into the exit path 252. It should be noted herein that the illustrated gasifier is an exemplary embodiment and other configurations of gasifiers are also envisaged. For example, in some embodiments, the exemplary quench chamber 216 may be disposed beneath a radiant syngas cooler configured to partially reduce the syngas temperature before syngas enters the quench chamber. The details of the quench chamber 216 are discussed in greater detail below with reference to subsequent figures.

As discussed herein, the hot effluent is fed from the combustion chamber 214 to the liquid coolant 232 in the quench chamber 216 via the passageway 240 of the dip tube 238. The lower end 244 of the dip tube 238 may be serrated, and positioned below the surface of the liquid coolant 232 to efficiently achieve cooling of the effluent. It should be noted herein that in the illustrated embodiment, there is no draft tube. The syngas is contacted with the liquid coolant 232 to produce a cooled syngas. The cooled syngas is impacted against an inner wall of the baffle 254. As the cooled gas stream impinges against the inner surface of baffle 254, the entrained liquid content in the gas stream will tend to coalesce on the inner surface of the baffle 254. The cooled syngas is then passed towards the exit path 252 of the quench chamber 216.

Figure 7:
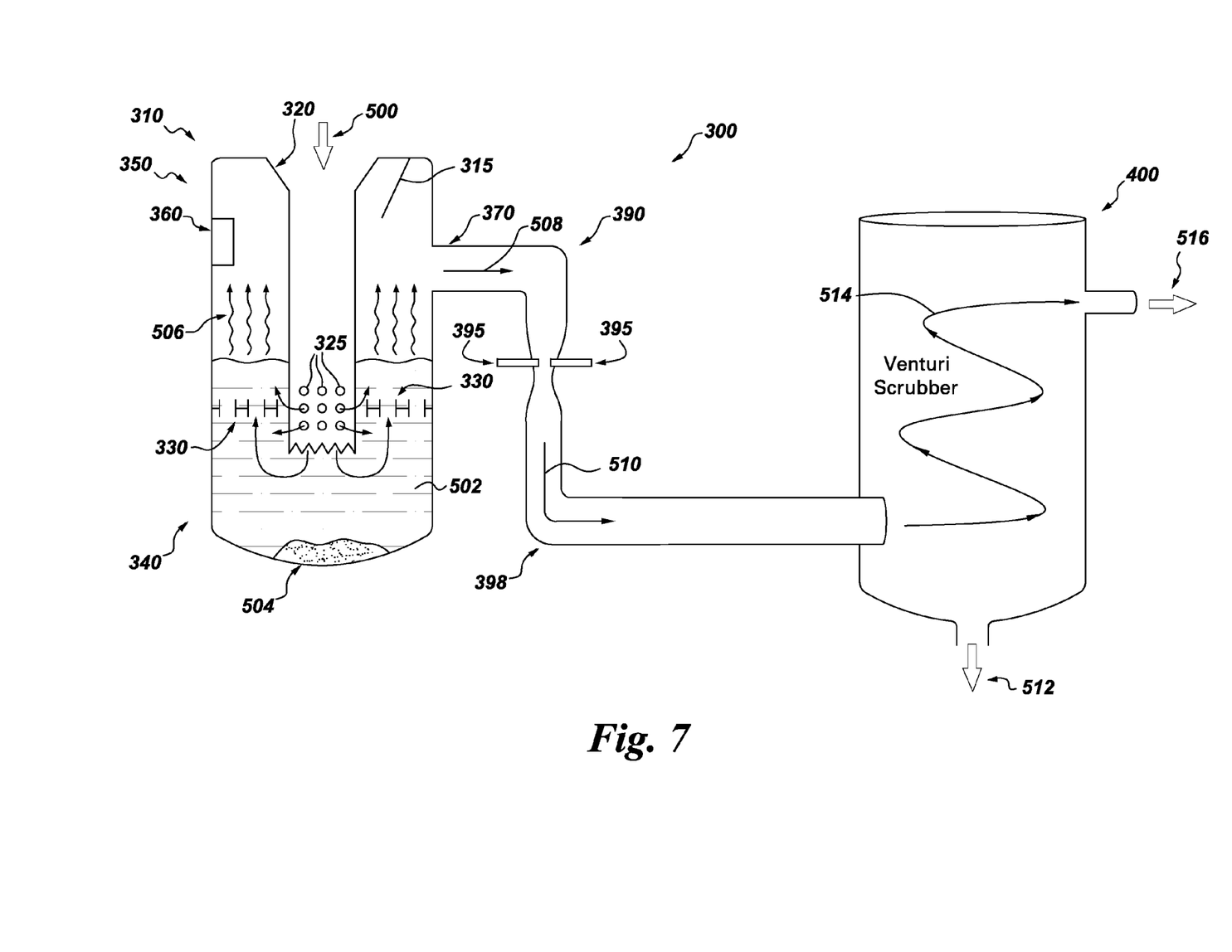
FIG. 7 is a schematic view of a gasification quench chamber and scrubber assembly, in accordance with an embodiment of the present invention.

Referring to FIG. 7, a gasification quench chamber and scrubber assembly, or gasification assembly 300, in accordance with aspects of the present invention is depicted. The gasification assembly 300 comprises a quench chamber 310 in fluid communication with a scrubber (e.g., venturi scrubber) 400.

The quench chamber 310 may comprise an improved quench chamber as discussed herein that comprises an upper portion 350 and a lower portion 340. The lower portion 340 may include a stability baffle 330 configured to dampen water level fluctuation and sloshing. Within the lower portion is a reservoir of coolant 502. The upper portion 350 may include a baffle 315 that provides a means to remove excess moisture, or water, contained in the existing syngas. In some embodiments, there is no baffle.

The quench chamber 310 further comprises a dip tube 320 that has a plurality of holes, or perforations 325 therethrough. The dip tube 320 extends from the upper portion 350 to the lower portion 340. In embodiments, a quench tube is not used. Accordingly, in those embodiments, there is no annular space between the dip tube and quench tube; instead the annular "space" in these embodiments extends all the way from the exterior of the dip tube 320 to the interior face of the upper portion 350 of the quench chamber 310.

The upper portion 350 further includes a cooling device 360 configured to cool the exiting syngas 506 as it travels towards an exit 370 in the upper portion 350 of the quench chamber 310.

As shown, a mixture of syngas, slag, and fines 500 enters the dip tube 320 from the upstream gasifier 11 (FIG. 1). The mixture 500 contacts a coolant 502 that is contained in the second portion 340 of the quench chamber 310. The mixture 500 cools upon contact with the coolant 502, wherein slag 504 settles at the bottom of the quench chamber 310. A cooled syngas 506 rises off of the coolant 502 above the stability baffles 330. As the cooled syngas 506 works towards the exit 370 it is further cooled by the cooling device 360. The additional cooling provided by the cooling device 360 aids in the further removal of entrained moisture within the syngas thereby providing a dry saturated syngas 508 that exits.

Once exiting the quench chamber 310, the dry saturated syngas 508 heads downstream towards the scrubber (e.g., venturi scrubber) 400. The dry saturated syngas 508 passes through a transfer line 390 towards a plurality of spray devices 395. The spray devices 395 further aid in removing fines and water from the syngas 510. As the syngas 510 travels to the venturi scrubber 400, additional fines and water 512 settle out, while centrifugal separation is applied to the rising syngas 514. A dry syngas 516 ultimately exits the venturi scrubber 400 to head towards, for example, the combustor 39 (FIG. 1).

Figure 8A:
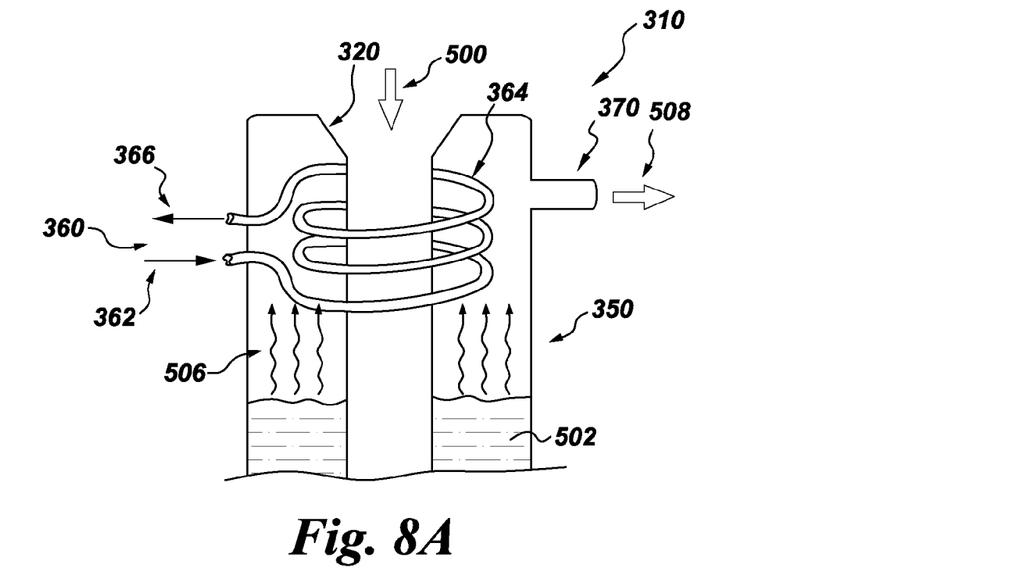
FIGS. 8A and 8B are close-up sectional views of an upper portion of a quench chamber in accordance with various embodiments of the present invention.

Referring to FIG. 8A a close up sectional view of an upper portion 350 of the quench chamber 310 is depicted. The cooling device 360 in the embodiment shown comprises a heat exchanger pipe located within the upper portion 350, above the coolant 502. As shown, an embodiment includes a cold water input line 362 leading to a helical heat exchanger line 364 which is surrounding the dip tube 320. At the other end of the heat exchanger line 364 is an exit line 366. As shown, cold water may enter the cold water input line 362. Upon the rising syngas 506 passing over the heat exchanger line 364, the cold water within the heat exchanger line 364 is heated so as to become hot water and/or steam. Thus, hot water and/or steam exits at the exit line 366 to return to, for example, a heat recovery steam generator 26 (FIG. 1) or other suitable device for reuse. The dry saturated syngas 508 exits the exit 370 of quench chamber 310.

The embodiment shown in FIG. 8A offers several advantages. The omission of a draft tube increases quench stability. The heat exchanger line 364, which is located in the gas phase of the quench chamber 310, increase the effective distance between the coolant 502 and the exit 370. The heat exchanger line 364 also provides a torturous or labyrinthine path for the syngas so that the need for any entrainment baffle(s) is diminished and/or altogether avoided. Further, the reuse of heat obtained by the heat exchanger line 366 increases the overall efficiency of the system.

Figure 8B:
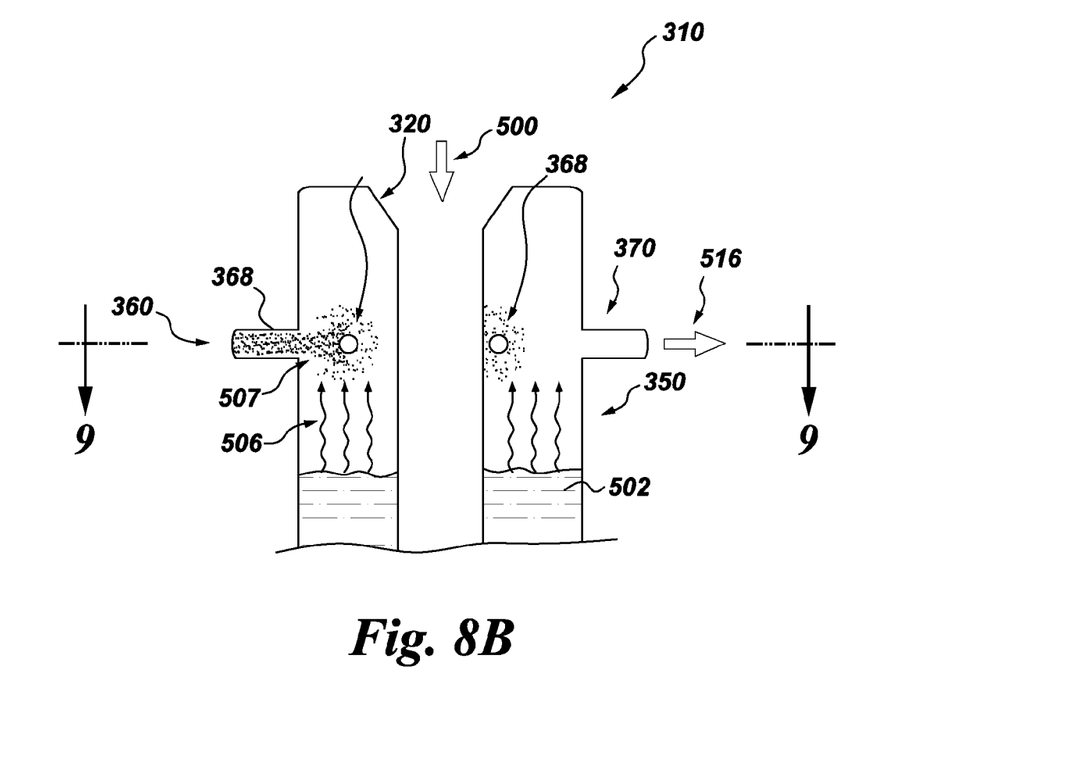

Referring to FIG. 8B a close up sectional view of an upper portion 350 of the quench chamber 310 of another embodiment is depicted. The cooling device 360 in the embodiment shown comprises a plurality of cold water emitters (e.g., sprayers) 368 in the upper portion 350 of the quench chamber 310, above the coolant 502. As shown in FIG. 8B and the plan view depicted in FIG. 9, an embodiment includes a plurality of cold water emitters 368 located circumferentially around the periphery of the upper portion 350 of the quench chamber 310. The cold water emitters 368 may be distributed uniformly and completely around the periphery with the exception of none being located near the exit 370. In this manner, the cold water emitters 368 are distributed in a perannular pattern. In this embodiment, a baffle (not shown) may or may not be employed. The dry saturated syngas 508 exits the exit 370 of quench chamber 310.

Figure 9:
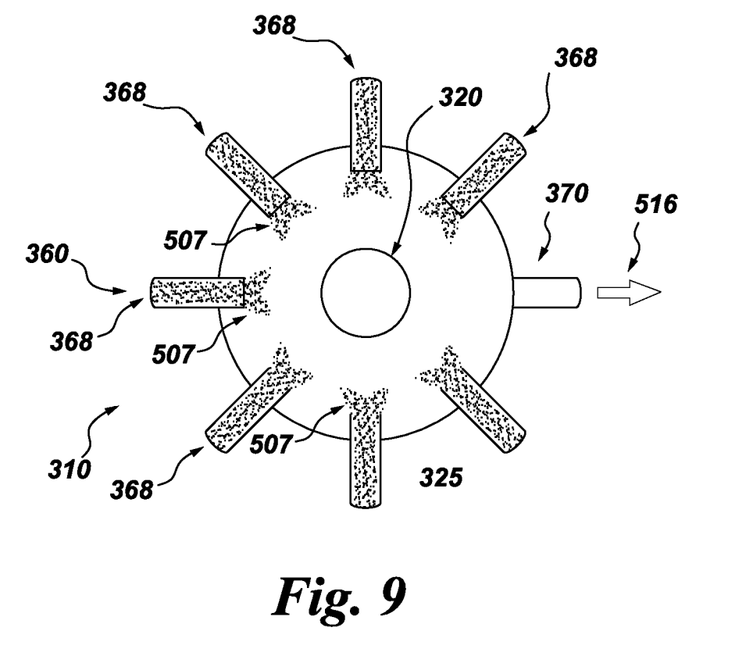
FIG. 9 is a sectional plan view of the upper portion of the quench chamber depicted in FIG. 8B.

The embodiment shown in FIGS. 8B and 9 offers several advantages. The omission of a draft tube increases quench stability. The perforated dip tube (see e.g., FIG. 7) increases stability and syngas aeration. Further, additional syngas cooling is providing by the water spray. Any plugging issues at the exit 370 are mitigated by providing the cold water emitters 368 only in the clean gas side of the upper portion 350 of the quench chamber 310.

Aspects of the present invention offer many advantages in the art of gasification quench chamber and scrubber design. First, by removing any draft tube and instead perforated the dip tube, the design avoids plugging issues in the dip-draft tube annulus. Complex annular flow regime and dynamics issues are also avoided. There is less entrainment by avoiding any complex two-phase regime. As a result, there is potential of reducing quench chamber diameter, while still obtaining the same syngas throughput.

In an embodiment, heat exchanger tubes to cool the syngas in the quench chamber replace the need for any entrainment baffle(s). Effective heat recovery is offered by pre-heating the water for heat recovery steam generator. Further, stability baffle(s) may be used to reduce quench dynamics and avoid sloshing.

In embodiments, a more effective venturi scrubber is used in lieu of current standard scrubbers. Demister assembly is not needed due to the centrifugal separation which aids in the removal of fines in the venturi scrubber.

It should be noted that various configurations of quench chamber, dip tube, and/or draft tube can be employed without departing from aspects of the present invention. For example, although certain figures herein (e.g., FIGS. 4, 6, 7, 8A, and 8B) depict a quench chamber having a dip tube-only configuration, the quench chamber may alternatively have a dip and draft tube tube-only configuration, a dip/draft with a quench ring configuration, and the like.

The various entrainment mitigation and/or flow damping mechanisms depicted in FIGS. 2-9 may be employed separately or in combination with one another. Moreover, as may be appreciated, the relative sizes, shapes, and geometries of the entrainment mitigation mechanisms may vary. The entrainment mitigation and/or flow damping mechanisms may be employed in a quench chamber during the initial manufacturing, or the entrainment mitigation and/or flow damping mechanisms may be retrofit into existing quench units. Further, the entrainment mitigation and/or flow damping mechanisms may be adjusted based on operational parameters, such as the type of carbonaceous fuel, the system efficiency, the system load, or environmental conditions, among others to achieve the desired amount of flow damping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gasification quench chamber comprising:
   a reservoir having a liquid coolant disposed in a lower portion therein and an upper portion comprising an exit for exiting a cooled syngas therefrom;
   a dip tube configured to introduce a syngas mixture to contact the liquid coolant thereby producing the cooled syngas, wherein an outer surface of the dip tube and an outer periphery of the reservoir define an annular space for the cooled syngas to flow;
   a cooling device placed in the annular space in the upper portion of the reservoir and configured to both further cool the cooled syngas in the annular space and to increase an effective distance between the liquid coolant and the exit, wherein the cooling device comprises a heat exchanger pipe that is not contacting the dip tube; and
   a stability device in the lower portion, configured to mitigate coolant level fluctuation and sloshing.

2. The gasification quench chamber of claim 1, further comprising a baffle in the upper portion configured to remove entrained liquid content from the cooled syngas.

3. The gasification quench chamber of claim 1, wherein the syngas mixtures comprises a syngas, slag, and fines.

4. The gasification quench chamber of claim 1, wherein a proximate end of the dip tube comprises a plurality of perforations, and the proximate end is proximate the lower portion of the reservoir.

5. The gasification quench chamber of claim 1, the cooling device further comprising a coolant emitter configured to emit a coolant into the upper portion.

6. The gasification quench chamber of claim 5, further comprising a baffle in the upper portion configured to remove entrained liquid content from the cooled syngas.

7. The gasification quench chamber of claim 5, wherein the coolant emitter comprises a plurality of coolant emitters disposed circumferentially around at least a portion of a periphery of the reservoir.

8. The gasification quench chamber of claim 7, wherein the plurality of coolant emitters are disposed in a perannular pattern such that no coolant emitter is proximate to the exit.

9. The gasification quench chamber of claim 1, wherein the heat exchanger pipe is disposed in a helical configuration in the upper portion.

10. The gasification quench chamber of claim 1, wherein the heat exchanger pipe is configured to produce at least one of steam or hot water therein by an interaction of the cooled syngas flowing over the heat exchange pipe.

11. The gasification quench chamber of claim 1, further comprising a draft tube surrounding the dip tube thereby defining an annular space therebetween.

12. The gasification quench chamber of claim 1, wherein the stability device comprises a baffle.

* * * * *

UNITED STATES PATENT AND TRADEMARK OFFICE
CERTIFICATE OF CORRECTION

| | | |
|---|---|---|
| PATENT NO. | : 9,028,569 B2 | Page 1 of 1 |
| APPLICATION NO. | : 12/968423 | |
| DATED | : May 12, 2015 | |
| INVENTOR(S) | : Tiwari et al. | |

It is certified that error appears in the above-identified patent and that said Letters Patent is hereby corrected as shown below:

In the Specification,

In Column 9, Line 9, delete "chamber 212" and insert -- chamber 214 --, therefor.

In Column 11, Line 29, delete "line 366" and insert -- line 364 --, therefor.

Signed and Sealed this
Twenty-ninth Day of September, 2015

Michelle K. Lee
*Director of the United States Patent and Trademark Office*